US012803330B2

(12) United States Patent
Kang

(10) Patent No.: US 12,803,330 B2
(45) Date of Patent: Nov. 17, 2026

(54) SYSTEM FOR SPECIFYING AND TRADING AIR RIGHTS USING NON-FUNGIBLE DIGITAL TOKENS

(71) Applicant: Sungwoon Kang, Busan (KR)

(72) Inventor: Sungwoon Kang, Busan (KR)

(73) Assignee: Sungwoon Kang, Busan (KR)

( * ) Notice: Subject to any disclaimer, the term of this patent is extended or adjusted under 35 U.S.C. 154(b) by 157 days.

(21) Appl. No.: 18/835,073

(22) PCT Filed: Jan. 26, 2023

(86) PCT No.: PCT/KR2023/001160
§ 371 (c)(1),
(2) Date: Aug. 1, 2024

(87) PCT Pub. No.: WO2023/149691
PCT Pub. Date: Aug. 10, 2023

(65) Prior Publication Data

US 2025/0166031 A1 May 22, 2025

(30) Foreign Application Priority Data

Feb. 4, 2022 (KR) ........................ 10-2022-0014502

(51) Int. Cl.
*G06Q 30/00* (2023.01)
*G06Q 20/06* (2012.01)
(Continued)

(52) U.S. Cl.
CPC .............. *H02J 50/10* (2016.02); *G06Q 20/06* (2013.01); *G06Q 20/36* (2013.01);
(Continued)

(58) Field of Classification Search
CPC .. G06Q 30/06; G06Q 30/0645; G06Q 40/055; G06Q 50/16
See application file for complete search history.

(56) References Cited

U.S. PATENT DOCUMENTS 9,552,736 B2 * 1/2017 Taveira .................. G01C 21/20
12,664,533 B1 * 6/2026 Thompson ......... G06Q 20/1235
(Continued)

FOREIGN PATENT DOCUMENTS

EP 3825951 5/2021
EP 3825951 A1 5/2021
(Continued)

OTHER PUBLICATIONS

Allam, Zaheer, and David Sydney Jones. "The potential of blockchain within air rights development as a prevention measure against urban sprawl." Urban Science 3.1 (2019): 38. (Year: 2019).*
(Continued)

*Primary Examiner* — Luis A Brown

(57) ABSTRACT

The present invention relates to a system for specifying and trading air rights using non-fungible digital tokens, the system comprising: headquarters for controlling the system; an air rights trading marketplace in which air rights issued as non-fungible digital tokens through a network are specified and air rights trading is carried out according to air rights registration information, air rights height restriction information, and agreed-upon transaction conditions; an operation unit for mediating the input and output of information; buyers, sellers, intermediaries, and authorities who access the air rights trading marketplace through the operation unit and possess respective electronic wallets; and distributed storage in which the originals of all air rights information set for specification are distributed outside the headquarters via the network and stored in an air rights registration table, and air rights height restriction table.

21 Claims, 4 Drawing Sheets

(51) Int. Cl.

| | |
|---|---|
| ***G06Q 20/36*** | (2012.01) |
| ***G06Q 30/0601*** | (2023.01) |
| ***H02J 7/90*** | (2026.01) |
| ***H02J 50/10*** | (2016.01) |

(52) U.S. Cl.
CPC .......... *G06Q 30/0607* (2013.01); *H02J 7/933* (2026.01); *H02J 7/975* (2026.01)

(56) References Cited

U.S. PATENT DOCUMENTS

| | | | | |
|---|---|---|---|---|
| 2006/0031082 | A1* | 2/2006 | Amaitis | G06Q 30/06 705/80 |
| 2016/0253907 | A1* | 9/2016 | Taveira | G01C 21/20 701/3 |
| 2017/0243494 | A1* | 8/2017 | Taveira | G01C 21/20 |
| 2019/0147553 | A1* | 5/2019 | Reber | G06Q 20/389 705/65 |
| 2020/0175623 | A1* | 6/2020 | Howie | G06Q 50/18 |
| 2021/0133713 | A1* | 5/2021 | Wang | G06Q 20/389 |
| 2021/0280068 | A1* | 9/2021 | Uetaki | G06Q 50/18 |
| 2024/0388457 | A1* | 11/2024 | Gordon | G06F 21/602 |

FOREIGN PATENT DOCUMENTS

| | | | | |
|---|---|---|---|---|
| JP | 2021-012460 | | 2/2021 | |
| JP | 2021-072116 | | 5/2021 | |
| KR | 10-2199567 | | 1/2021 | |
| KR | 102199567 | B1 | 1/2021 | |
| KR | 10-2322511 | | 11/2021 | |
| KR | 102322511 | B1 | 11/2021 | |
| WO | WO-2019033090 | A1 * | 2/2019 | G06Q 50/16 |
| WO | 2020/016962 | | 1/2020 | |
| WO | WO2020/016962 | A1 | 1/2020 | |

OTHER PUBLICATIONS

Liu, Yan, and Chao Shang. "Application of blockchain technology in agricultural water rights trade management." Sustainability 14.12 (2022): 7017. (Year: 2022).*

Pee, Seung Jae, et al. "Blockchain based smart energy trading platform using smart contract." 2019 international conference on artificial intelligence in information and communication (ICAIIC). IEEE, 2019. (Year: 2019).*

"Office Action for Korea Patent Application No. 10-2022-0014502, mailed Dec 11, 2023."

"Office Action for Japan Patent Application No. 2024-546407, mailed Dec 2, 2025."

* cited by examiner

SYSTEM FOR SPECIFYING AND TRADING AIR RIGHTS USING NON-FUNGIBLE DIGITAL TOKENS

TECHNICAL FIELD

The present invention relates to a system of specifying and trading air rights, which supports the activation of air rights trading for specifying and trading air rights of the airspace above land owned by a landowner by giving exclusivity and credibility to air rights using non-fungible digital tokens.

BACKGROUND ART

The land owned by the landowner is recognized as an asset that can be traded, and air rights result in trading value due to shortages and surpluses by setting a virtual upper limit on the airspace of the land, an example of which is carbon emission rights trading.

In addition, with the increase in the demand for funding due to downtown capacity and height management, aging structure remodeling, and reconstruction, as well as the legal demand for adjusting rights such as view rights and sunlight rights, specifying and valuing air rights are important, but it is currently challenging to solve using existing technology.

Furthermore, while land ownership rights are constantly specified in the land register, air rights face issues that arise specifications from setting according to changes in rights, and the existing land register system only recognizes presumptive power regarding ownership rights and does not recognize public credibility, therefore, methods granting exclusivity and public credibility for changes in real rights are required to activate air rights trading.

Moreover, as mobility technology advances, a system that constantly specifies air rights settings and supports smooth trading for setting urban air mobility routes and evasions, as well as for adjusting and transferring responsibilities in case of legal disputes, is required.

DISCLOSURE

Technical Problem

The object of the present disclosure to provide exclusivity and credibility to air rights by allowing activation of trading by explicitly always specifying the setting of air rights with a non-fungible digital token in order to improve the limitations of existing technology.

Another object of the present disclosure is to enable integrated trading by encompassing not only the inherent concept of air rights transferring unused space on the upper part of land but also the expanded concept of transferable development rights leasing unused development rights from one side to another as means of the above.

Another object of the present disclosure is to prevent innocent victims by securing the safety of trading and to supply additional liquidity to the existing real estate market by enabling fractional trading of air rights as a means of the above.

Another object of the present disclosure is to improve market trading value because of artificial shortages or surpluses by allowing the height setting of air rights depending on differentially applied regulations or the needs of owners as means of the above.

Technical Solution

In order to achieve the above object and solve the problems of traditional technology, the present disclosure related to an air rights specification and trading system using a non-fungible digital token comprises: a headquarters controlling the system; an air rights trading marketplace where the air rights trading is executed according to registration information of surpluses air rights, height restriction information of air rights and desired transaction conditions, wherein the air rights are specified by non-fungible digital tokens issued through the network; an operation unit mediating the input and output of information; buyers, sellers, intermediaries, and authorities accessing the air rights trading marketplace through the operation unit with their respective electronic wallets; and a distributed storage storing originals of all air rights information set for specification of air rights distributed through the network outside the headquarters to an air rights registration table, an air rights height restriction table, and a transaction condition table.

The headquarters, forming one aspect of the present invention, comprises: a main server in which installed member information database and map information database; an operation unit; a verification unit validating the availability of information recorded in the main server through the operation unit; and a blockchain server in which installed air rights database consisting of an air rights registration table with general information of air rights setting for specification, a height restriction table of air rights, and a transaction condition table.

The member information database, forming another aspect of the present invention, consists of a registered member table, and the map information database consists of map information and a height restriction information table allowing input of the height setting of air rights according to differentially applied regulations or owner's needs.

Advantageous Effect

According to the present invention, the present invention is proposed to improve the prior art as described above, and the exclusivity is provided with a non-fungible digital token to constantly specify the rights related to airspace, thereby overcoming differences in legal interpretation and enabling integrated trading of air rights, as well as allowing fractional trading and fractional leasing.

Furthermore, according to the present invention, by distributed storing the originals of all air rights information set through the network, credibility can be granted, forgery and falsification can be blocked, innocent victims due to the double transfer of rights can be fundamentally prevented, and, additionally, it is possible to automatically pay taxes to the government immediately upon contract conclusion.

Moreover, according to the present invention, by allowing input the height setting of air rights according to differentially applied development regulations or owner's needs, it is possible to enhance trading value in the market due to artificial shortages and surpluses.

BEST MODE FOR INVENTION

Figure 1:
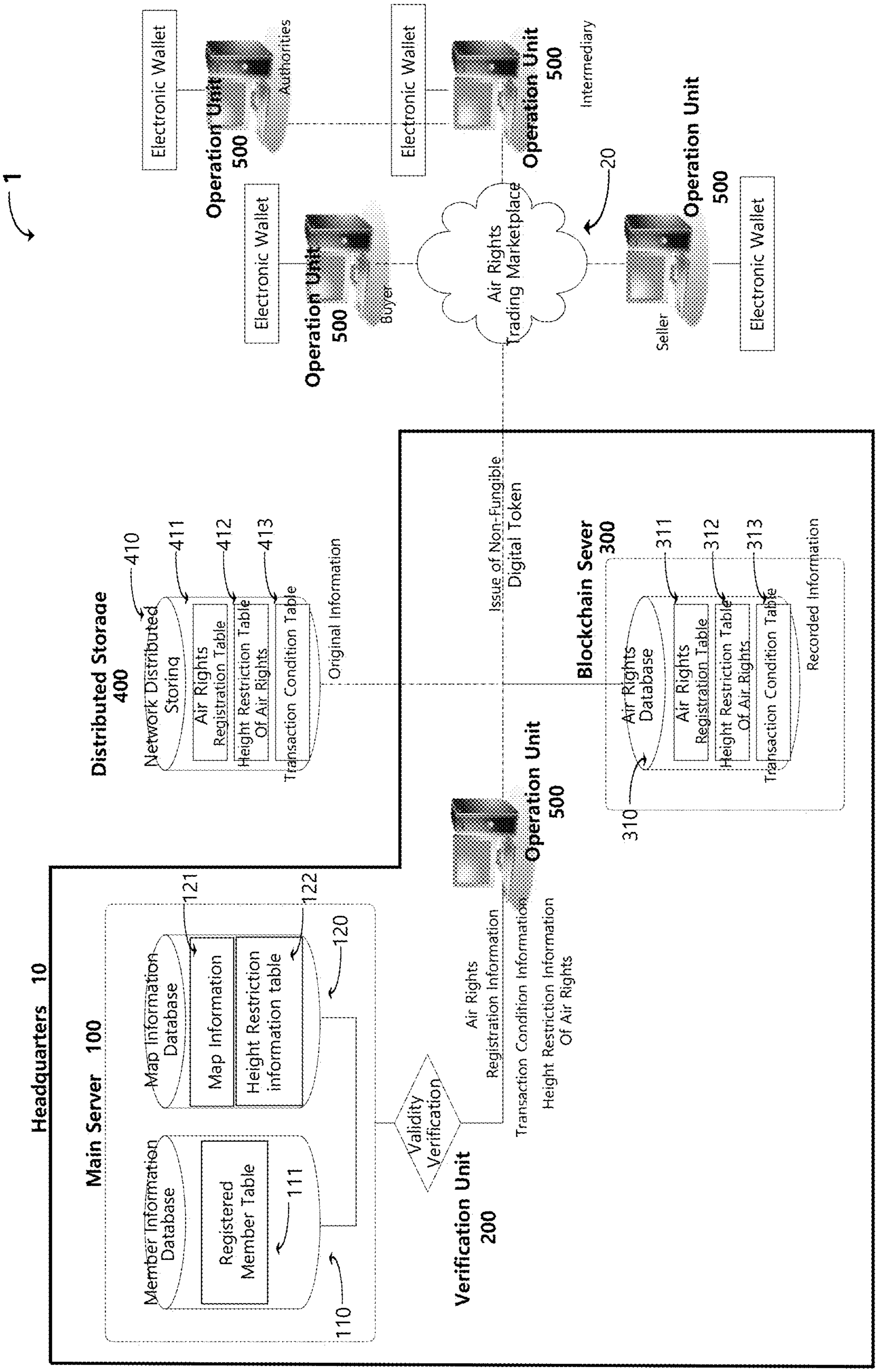
FIG. 1 illustrates a conceptual diagram of an air rights specification and trading system based on digital tokens related to the present invention.

Hereinafter, the present disclosure will be described in detail with reference to examples. However, the following examples are for illustrative purposes only and are not intended to limit the scope of the present invention. The same reference numerals in each drawing indicate the same parts.

Figure 2:
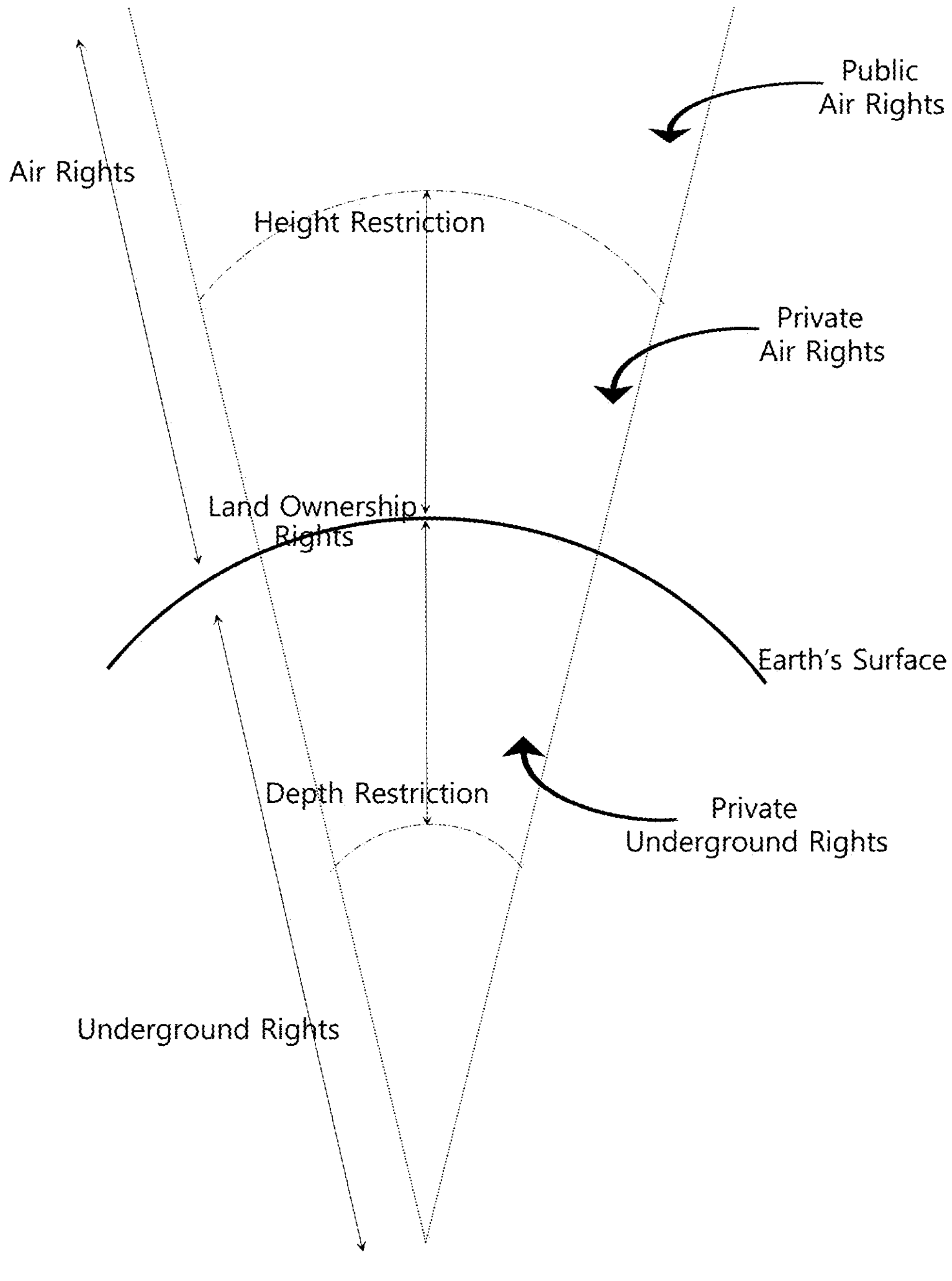
FIG. 2 shows three-dimensional rights that a landowner has on the upper and lower spaces of the land.
Figure 3:
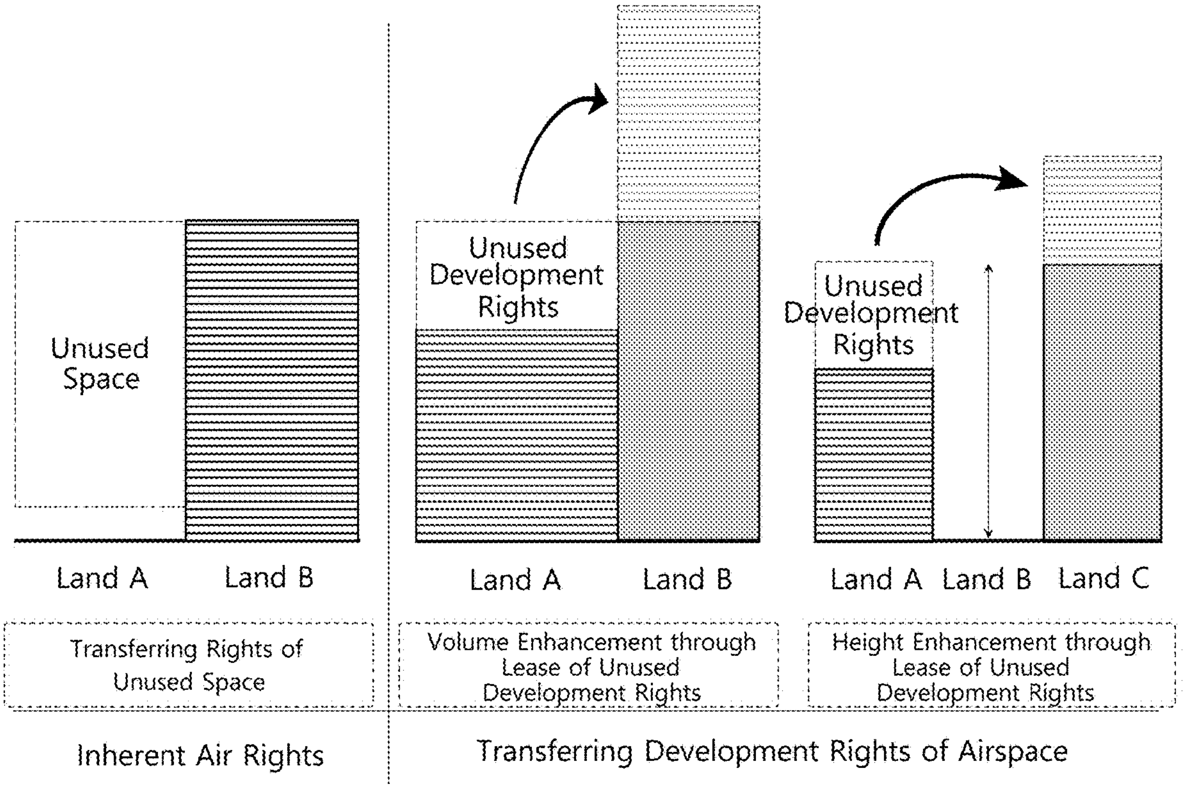
FIG. 3 is drawn to distinguish between the inherent air rights representing the transfer of the ownership of unused spaces and the transfer of development rights representing the lease of unused development rights.
Figure 4:
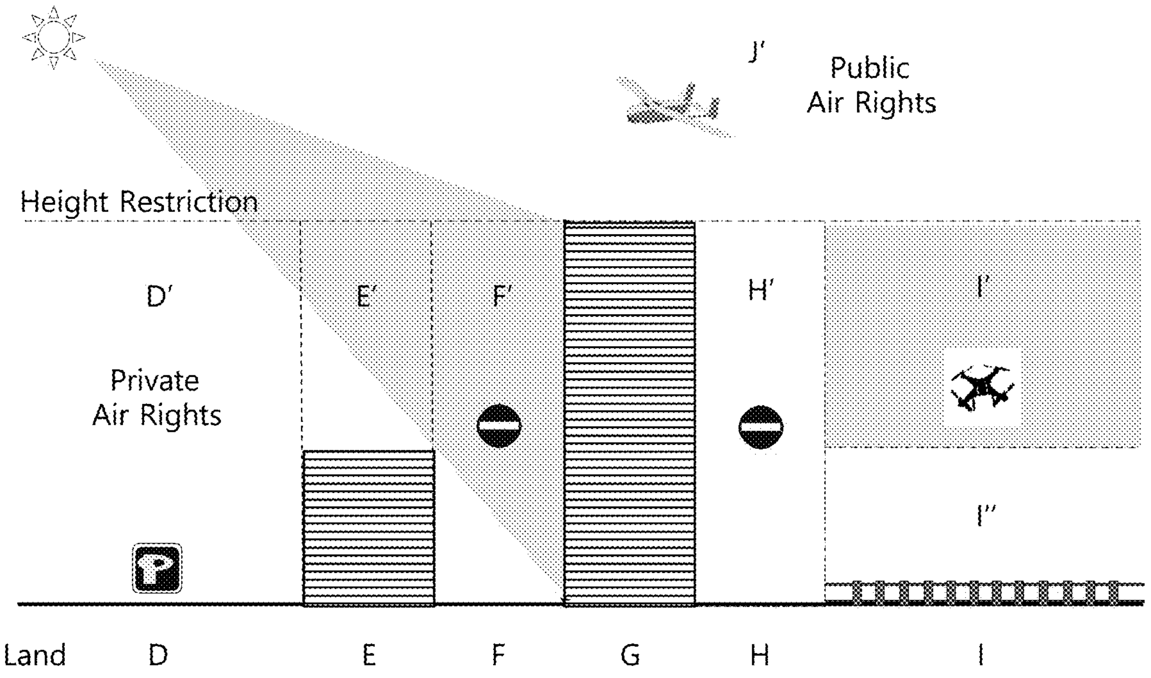
FIG. 4 shows an embodiment of the air rights specification and trading for adjusting private rights, including view rights and daylight rights, according to the present invention.

FIG. 1 shows a conceptual diagram of an air rights specification and trading system using digital tokens related to the present invention, FIG. 2 shows three-dimensional rights that the ownership of a land owner exerts on the upper and lower spaces of the land, FIG. 3 is shown to distinguish between the inherent air rights representing the ownership transfer of unused spaces and the transfer of development rights representing the lease of unused development rights, and FIG. 4 shows an embodiment of the air rights specification and trading for adjusting private rights including view rights and daylight rights according to the present invention.

The air rights specification and trading system (1) by a non-fungible digital token, according to the present invention, includes a main server (100), a verification unit (200), a blockchain server (300), an operation unit (500) inside the headquarters (10), a distributed storage (400) outside the headquarters (10), an air rights trading marketplace (20), an operation unit (500) supporting member's input and output of information, and a buyer, a seller, an intermediary, and authorities who have a unique electronic wallet. The air rights specification and trading system (1) by a non-fungible digital token, according to the present invention, records general information of the air rights set in the headquarters (10) to the blockchain server (300) and grants credibility by distributing and storing the recorded originals of all air rights information set through the distributed storage (400) via the network, and is able to activate the trade by granting exclusivity through the creation of a non-fungible digital token. The air rights referred to here means the rights to the space that exists in the airspace above the land owned by the owner, where the owner's legitimate exercise of rights is recognized, and that it means the exclusive right to be leased or transferred for the range and period of the air rights set by the performance of a contract stipulated in the digital token.

The main server (100), which forms one aspect of the headquarters (10), registers members by recording the information of the members to a registered member table (111) in the member information database (110) when buyers, sellers, intermediaries, and authorities apply for membership registration after entering unique information through the air rights marketplace via the network, and each member creates an electronic wallet for deposit and withdrawal of payment according to a predetermined procedure.

The map information database (120), forming one aspect of the main server (100), provides map information for the specification of air rights and range of air rights to members and displays the output image of map information (121) installed in the map information database (120) to the display device attached to each member's operation unit (500). The map information database (120) may need to construct a map server separately due to overload in case of excessive display information with an increase in members. In this case, the current method of constructing the map information database (120) within the main server (100), a method of constructing a separate map server outside the main server (100) but within the headquarters (10), or a method of utilizing map information services provided by map specialist companies via the network can be all considered.

The height restriction information table (122), forming one aspect of the map information database (120), allows recording of the height setting of air rights according to differentially applied development regulations or owner's needs. As shown in FIG. 2, if there are no regulations regarding height or volume, the air rights are considered to be limited to the private air rights existing under the public air rights without recording in the height restriction information table (122).

The verification unit (200) forming one aspect of the headquarters (10) is installed in order to improve the reliability of the air rights trading marketplace (20) as a means of preventing false sale listings and promoting social welfare by verifying the information validity of the registration information of the air rights, the height restriction information of the air rights, and transaction condition information, which are set by the input of a member through the operation unit (500). In case of verification failure, the verification unit notifies the member of this verification failure and requests correction or cancellation of the input information.

The blockchain server (300), forming one aspect of the headquarters (10), systematically records information authorized through the verification unit (200) in the air rights registration table (311), the height restriction information table (312), and the transaction conditions table (313) which are inside of the air rights database (310).

The distributed storage (400) forming one aspect of the present invention grants credibility to the specified air rights and enables integrated trades despite legal differences between the transfer of unused airspace and the leasing of unused development rights by distributing and storing the originals of all air rights information set authorized through the verification unit (200) via the network. FIG. 3 shows the legal differences between the inherent air rights that transfer the unused space above the land surface and the transfer of development rights that lease unused development rights. This is one of the main concepts of the present invention that constitutes the overall integrated advancement through overcoming legal differences that were difficult to implement with conventional technology rather than a simple combination of blockchain technology.

The operation unit (500) inside the headquarters (10), forming one aspect of the present invention, comprises a display device that outputs general information in images, an operation processing unit and an input device. Also, the operation unit (500) outside the headquarters (10), forming another aspect of the present invention, mediates information input/output between the headquarters (10) and buyers, sellers, intermediaries, and the authorities who have their own electronic wallets through the air rights trading marketplace (20) and the operation unit (500) outside the headquarters (10) can be replaced with portable devices equipped with all devices and units described above and network connectivity. In particular, the intermediaries are one of the key parts for the activation of the air rights specification and trading system (1) using non-fungible digital tokens related to the present invention and may have the advantage of immediately depositing the agreed fees of the non-fungible digital tokens into the intermediary's electronic wallet upon the occurrence of trading by attracting the setting and specification of landowner's air rights. Furthermore, specified taxes within the non-fungible digital tokens are deposited immediately into the government's electronic wallet upon the occurrence of trading.

The air rights trading marketplace (20), forming one aspect of the present invention, specifies the air rights generated by the non-fungible digital token in the headquarters (10) via the networks and conducts integrated trading of the air rights by the transaction conditions.

MODE FOR INVENTION

For one example of air rights trading, FIG. 4 shows a detailed example of the air rights specification and trading according to the present invention for the adjustment of private rights, including view rights and daylight rights. In the case where owners of land G with high-rise structures above the land G wish to prevent expected infringements on view rights or daylight rights in the future as a property means, owners of land G can post their intention to buy air rights E' for owners of land E on the air rights trading marketplace (20).

As another example, for the financing of remodeling, all the owners of land E agree with a single-member registration, post a sales order for air rights E' in the air rights trading marketplace (20), and settle the contract immediately through an electronic wallet according to the contract conditions. Ownership change information and transaction history are updated in the blockchain server (300) and are simultaneously updated in the distributed storage (400) to give credibility.

For another example, if the owner of land F engaging in agriculture wishes to effectively utilize unused airspace through the trading of air rights F', the owner of land F posts the intention to sell the air rights F' on the air rights trading marketplace (20), then landowners of land G can secure daylight rights and view rights, and even prevent violations of portrait rights and privacy as property means through buying the posted air rights F'. In this case, changing the setting information of the acquired air rights F' to a no-fly status would suffice, which, if the setting heights of air rights F' is modified to 0 m on the height restriction information table (122), can be reflected in the map information (121) for other members to look up about the purpose. If unauthorized aerial vehicles intentionally intrude into the air rights F' area, the owner of the air rights F' can obtain legal benefits by sanctioning them as property means due to illegal occupancy, and by additionally acquiring air rights H', the owner of the air rights can expect even more perfect legal benefits.

For another example, if a logistics operation unit using aerial vehicles wishes to establish an aerial delivery route in the unused airspace above the railway tracks located on land I owned by the railway administration, the logistics operation unit using aerial vehicles can secure a dedicated aerial delivery route by purchasing the air rights I' and the railway administration secures additional financial resources through trading of unused space. If the Railway Administration plans to install structures on the unused airspace of air rights I" located below the airspace of air rights I' through selling the air rights I", they can similarly sell the air rights I" through a competitive bidding process via the air rights trading marketplace (20) after setting the details accordingly.

In another example, when the government plans to set flight paths for passenger transportation aerial vehicles in urban areas, the government can achieve the policy goal by updating height setting information in the height restriction information table (122) after specifying the government's ownership of air rights J' that does not infringe on the legitimate air rights of land D, land E, land F, land G, and land H owners. With this method, the government can avoid unilateral regulations like existing height restrictions and, effectively regulate urban development activities, and promote balanced land development by actively acquiring or specifying ownership of air rights through property means rather than regulation.

The invention claimed is:

1. A system for issuing and trading air rights tokens through generation of non-fungible digital tokens, the system comprising:

a headquarters (10) comprising:

a main server (100) configured to maintain a member information database (110) having a registered member table (111) for recording members comprising buyers, sellers, intermediaries, and authorities each associated with an electronic wallet, and a map information database (120) having map information (121) and a height restriction information table (122) configured to record a restricted height setting of air rights, a verification unit (200) configured to execute a two-stage pre-issuance compliance verification prior to authorizing token generation for the recorded air rights by being configured to:

(1) perform a spatial verification by:

receiving air rights registration data including a geospatial location, height, and a timing of the air rights being registered;

retrieving spatial constraints including programable exclusion zones; and determining whether the received air rights registration data satisfies the retrieved spatial constrains; and (2) perform a financial verification by:

retrieving financial authorization data associated with the registered air rights;

and verifying whether the financial authorization data satisfies at least one policy-based financial condition, the policy-based financial condition comprising: (i) a government-guaranteed payment obligation, (ii) a digitally escrowed payment confirmed via public registry, (iii) a programmable payment module pre-approved by a regulatory authority;

wherein upon a verification failure, the verification unit notifies the verification failure to a corresponding system member and requests correction or cancellation of the input information;

a blockchain server (300) communicatively coupled to the verification unit and a distributed storage (400) via a network, the blockchain server comprising:

an air rights database (310) configured to systematically record information authorized by the verification unit (200), the air right database subdivided into:

an air rights registration table (311) configured to record general specification data of an air rights setting:

a height restriction table (312) configured to record the verified spatial compliance data including the restricted height setting:

a transaction condition table (313) configured to record the verified financial compliance data; and issuance logic configured to generate the non-fungible token for the recorded air rights, only if both the spatial and financial conditions are met;

wherein the blockchain server is configured to;

execute issuance of the non-fungible digital token over the network to grant exclusivity to the registered air rights, store metadata of the non-fungible digital token within the air rights database (310); and manage audit logs comprising ownership change information and transaction history within the transaction condition table;

the distributed storage communicatively coupled to the blockchain server via the network, the distributed storage configured to store original records of the validated input information; and an operation unit (500) comprising a user interface comprising, the operation unit configured to:

display, via the interface, a compliance verification status and graphical map images including a restricted height setting of air rights;

receive, via the interface, a registrant identity and air rights transaction parameters; and receive the verification failure notification from a verification unit (200) and ingest a corresponding corrective input via the interface to trigger downstream token generation.

2. The system of claim 1, wherein the blockchain server is synchronized with a public registry containing approved payment instruments and regulatory policies.

3. The system of claim 1, wherein the verification unit is configured to execute the two-stage pre-issuance compliance verification using both centralized (governmental) validation sources and decentralized (blockchain-based) validation sources.

4. The system of claim 1, wherein the metadata of the non-fungible digital token defines a verified financial condition type, an identity of a certifying authority, and a policy approval window.

5. The system of claim 1, wherein the system is configured to condition subsequent reuse of an expired non-fungible digital token upon re-verification of the non-fungible digital token under updated financial conditions.

6. The system of claim 1, wherein the non-fungible digital token is compatible with third-party trading platforms only after ongoing compliance re-verification.

7. The system of claim 1, wherein the block chain server is configured to enforces token expiration unless extended via an updated policy confirmation.

8. The system of claim 1, wherein an index of the blockchain server links the non-fungible digital tokens to geofenced spatial regions governed by airspace law.

9. The system of claim 1, wherein issuance of the non-fungible digital token is subject to a programmable multi-signature process involving a financial and regulatory co-signatory.

10. The system of claim 1, wherein the spatial constraints that are programmable include a zero-meter (Om) altitude exclusion zone, which, when registered in the height restriction table, proactively prohibits issuance, validation, or transfer of any air rights token associated with the designated spatial region, thereby enforcing absolute flight denial and system-level spatial exclusivity through automated verification logic.

11. A computer-implemented method for issuing and trading air rights tokens through generation of non-fungible digital tokens within a network architecture, the method comprising: maintaining, by a main server (100) at a headquarters (10);

a member information database (110) having a registered member table (111) for recording members comprising buyers, sellers, intermediaries, and authorities, each associated with an electronic wallet; and a map information database (120) having map information (121) and a height restriction information table (122) configured to record a restricted height setting of air rights;

executing, by a verification unit (200), a two-stage pre-issuance compliance verification prior to authorizing token generation for the recorded air rights, the two-stage pre-issuance compliance verification comprising:

(1) performing a spatial verification by:

receiving air rights registration data including a geospatial location, a height, and a timing of the air rights being registered:

retrieving spatial constraints including programmable exclusion zones; and determining whether the received air rights registration data satisfies the retrieved spatial constraints; and (2) performing a financial verification by:

retrieving financial authorization data associated with the registered air rights; and verifying whether the financial authorization data satisfies at least one policy-based financial condition, the policy-based financial condition comprising: (i) a government-guaranteed payment obligation, (ii) a digitally escrowed payment confirmed via public registry, or (iii) a programmable payment module pre-approved by a regulatory authority:

notifying, by the verification unit upon a verification failure, the verification failure to a corresponding system member and requesting correction or cancellation of the input information;

systematically recording information authorized by the verification unit within an air rights database (310) of a blockchain server (300) that is communicatively coupled to the verification unit and a distributed storage (400) via a network, the step of systematically recording comprising:

recording general specification data of an air rights setting in an air rights registration table (311) of the air rights database;

recording the verified spatial compliance data including the restricted height setting in a height restriction table (312) of the air rights database; and recording the verified financial compliance data in a transaction condition table (313) of the air rights database;

generating, via issuance logic on the blockchain server, the non-fungible digital token for the recorded air rights only upon receiving an authorization signal from the verification unit confirming the concurrent satisfaction of both the spatial constraints and the policy-based financial condition;

processing ledger operations, by the blockchain server, comprising:

executing issuance of the non-fungible digital token over the network to grant exclusivity to the registered air rights:

storing metadata of the non-fungible digital token within the air rights database; and managing audit logs comprising ownership change information and transaction history within the transaction condition table:

storing, in the distributed storage communicatively coupled to the blockchain server via the network, original records of the validated input information; and operating an operation unit comprising a user interface to:

display, via the interface, a compliance verification status and graphical map images including a restricted height setting of air rights:

receive, via the interface, a registrant identity and air rights transaction parameters; and receive the verification failure notification from the verification unit and ingest a corresponding corrective input via the interface to trigger downstream token generation.

12. The method of claim 11, further comprising updating database of the financial condition in real time based on published government policy changes via an application programming interface (API).

13. The method of claim 11, further comprising storing each issuance decision into an immutable blockchain log for auditability.

14. The method of claim 11, wherein a financial settlement associated with the air rights transaction parameters includes conditional release from a government-tied vault upon compliance verification.

15. The method of claim 11, further comprising generating alerts for regulatory review upon detection of unauthorized policy conditions.

16. A non-transitory computer-readable medium comprising instructions that, when executed by a processor, cause the processor to perform the method of claim 14.

17. The computer program product of claim 16, wherein the instructions include logic for revoking the non-fungible digital tokens upon detection of post-issuance financial invalidity.

18. An apparatus for issuing and trading air rights tokens through generation of non-fungible digital tokens, the apparatus comprising:

a main server configured to maintain:

a member information database (110) having a registered member table (111) for recording members comprising buyers, sellers, intermediaries, and authorities, each associated with an electronic wallet; and a map information database (120) having map information (121) and a height restriction information table (122) configured to record a restricted height setting of air rights;

a verification unit (200) configured to execute a two-stage pre-issuance compliance verification prior to authorizing token generation for the recorded air rights by being configured to:

(1) perform a spatial verification by:

receiving air rights registration data including a geospatial location, a height, and a timing of the air rights being registered:

retrieving spatial constraints including programmable exclusion zones; and determining whether the received air rights registration data satisfies the retrieved spatial constraints; and (2) perform a financial verification by:

retrieving financial authorization data associated with the registered air rights; and verifying whether the financial authorization data satisfies at least one policy-based financial condition, the policy-based financial condition comprising: (i) a government-guaranteed payment obligation, (ii) a digitally escrowed payment confirmed via public registry, or (iii) a programmable payment module pre-approved by a regulatory authority:

wherein upon a verification failure, the verification unit notifies the verification failure to a corresponding apparatus member and requests correction or cancellation of the input information;

a blockchain server (300) communicatively coupled to the verification unit, the blockchain server comprising:

an air rights database (310) configured to systematically record information authorized by the verification unit, the air rights database subdivided into:

an air rights registration table (311) configured to record general specification data of an air rights setting:

a height restriction table (312) configured to record the verified spatial compliance data including the restricted height setting; and a transaction condition table (313) configured to record the verified financial compliance data; and issuance logic configured to generate the non-fungible token for the recorded air rights only upon receiving an authorization signal from the verification unit confirming the concurrent satisfaction of both the spatial constraints and the policy-based financial condition;

wherein the blockchain server is configured to:

execute issuance of the non-fungible digital token over a network to grant exclusivity to the registered air rights:

store metadata of the non-fungible digital token within the air rights database; and manage audit logs comprising ownership change information and transaction history within the transaction condition table:

a distributed storage (400) being coupled to the blockchain server via the network, wherein the distributed storage is configured to store original records of the validated input information; and an operation unit comprising a user interface, the operation unit configured to:

display, via the interface, a compliance verification status and graphical map images including a restricted height setting of air rights;

receive, via the interface, a registrant identity and air rights transaction parameters; and receive the verification failure notification from the verification unit and ingest a corresponding corrective input via the interface to trigger downstream token generation.

19. The apparatus of claim 18, wherein the verification unit is further configured to verify cryptographic signatures using a regulatory public key infrastructure.

20. The apparatus of claim 18, wherein spatial and financial verifications are executed asynchronously to reduce processing latency.

21. The apparatus of claim 18, wherein the verification unit blocks issuance of any non-fungible digital token associated with prohibited altitude bands or national airspace restrictions.

* * * * *